Patented July 19, 1927.

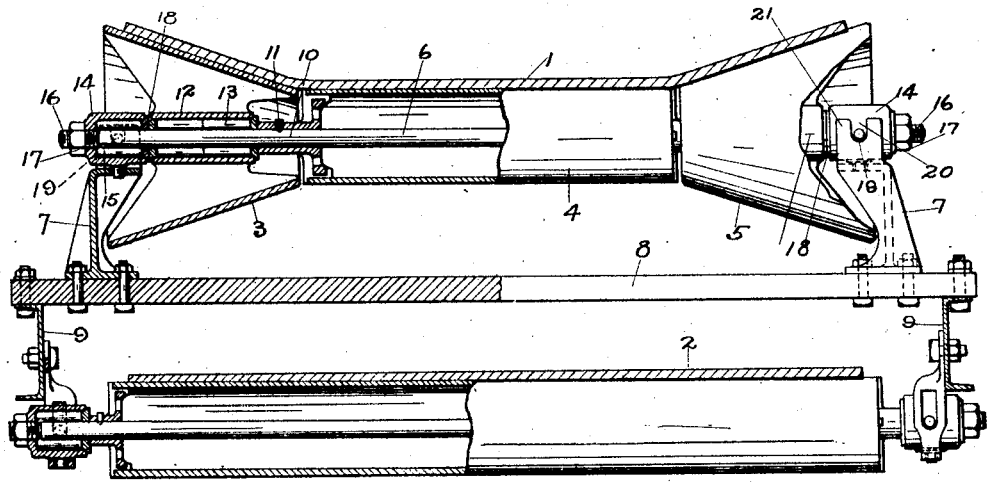

1,636,051

UNITED STATES PATENT OFFICE.

GEORGE D. FRANCISCO, OF COLUMBUS, OHIO, ASSIGNOR TO THE JEFFREY MANUFACTURING COMPANY, OF COLUMBUS, OHIO, A CORPORATION OF OHIO.

CONVEYER MECHANISM AND PARTICULARLY CONVEYER PULLEY SUPPORTS.

Application filed October 26, 1922. Serial No. 597,189.

The present invention relates to certain new and useful improvements in multiple pulley belt supports adapted to the support of an endless conveyer belt, and to bend it along longitudinal lines to form a trough adapted to convey granular and pulverized material without spillage along the edges of the belt.

As heretofore constructed, multiple pulley belt supports have possessed certain inherent defects which it is the purpose of this invention to overcome.

It is the especial object of this invention to provide a device of the class described, of cheap and durable construction wherein the wear upon the under surface of the belt due to the differential revolution of the supporting pulleys is reduced to a negligible minimum.

The devices by which I achieve this object are fully set forth in the following specification and illustrated in the accompanying drawings of which—

Fig. 1 is a side elevation of the preferred embodiment of my invention.

Fig. 2 is an end elevation of the devices illustrated in Fig. 1.

Like numerals refer to similar parts in both figures.

In the drawings the numeral 1 refers to the upper or carrying strand of an endless conveyer belt, and the numeral 2 to the lower or return strand of the same belt. The carrying strand 1 is supported upon a carrier comprising three pulleys 3, 4, and 5, arranged end to end upon a common shaft 6. The shaft 6 extends transversely of the conveyer and is supported upon two upstanding brackets 7 which are bolted to a plank 8 adapted to be attached to any convenient members of the supporting structure such as the longitudinally extending channel bars 9. The middle pulley 4 is preferably cylindrical in form, and is composed of a length of metallic tubing into the ends of which are fixed the gudgeons 10. The gudgeons 10 are secured to the shaft 6 in any preferred manner, as by the set screws 11. The pulleys 3 and 5 are conical in form and are oppositely disposed, and are of such contour as to correspond with the desired cross section of the conveyer trough. The conical pulleys may, if desired, be formed integral with the hubs 12 which are bored to a suitable diameter to receive a plurality of longitudinally extending rollers 13 which constitute an antifriction bearing upon which the pulley may freely revolve relative to the shaft 6.

At each end the shaft 6 projects into the bearing shell 14 within which are assembled a plurality of longitudinally extending rollers 15 which constitute antifriction bearings for the shaft 6 upon which said shaft may freely revolve. Hardened steel plugs 16 are screw threaded into the outer end of the bearing shells 14 and engage the ends of the shaft 6 to limit its longitudinal movement, and nuts 17 fitted upon the plugs 16 lock said plugs against accidental disarrangement. Fitted into the open ends of the shells 14 and of the hubs 12 are hardened and polished steel plates 18 which serve the double purpose of retaining the rollers in operative position, of excluding dirt from the bearings, and, by their contact with each other, acting as thrust bearings between the pulleys and the end bearings.

Formed on the bearing shells 14 are laterally projecting trunnions 19 which engage notches 20 formed on the upper ends of the arms 21 of the brackets 7. The bearings 14 are thus made self aligning and insure a frictionless support for the shaft 6.

By the construction above described I have produced a multiple pulley belt support of cheap and durable construction, which is convenient of installation, efficient in operation and economical of maintenance, and in the use of which the wear upon the underside of the belt caused by the differential speeds of rotation of the pulleys is reduced to a negligible minimum.

What I claim is:—

1. In conveyer mechanism, the combination of a suitable support, self aligning bearings mounted on said support, a shaft carried by said bearings, a belt supporting pulley fixed to said shaft, and coned belt edge supporting pulleys adjacent each end of said fixed pulley and freely rotatable on said shaft.

2. In conveyer mechanism, the combination of a suitable support, self aligning bearings mounted on said support, a shaft carried by said bearings, a belt supporting pulley fixed to said shaft, belt edge supporting pulleys adjacent each end of said fixed pulley and freely rotatable on said shaft, antifriction bearings between said end pulleys and said shaft, and thrust bearings between said end pulleys and said self aligning bearings.

In testimony whereof I affix my signature.

GEORGE D. FRANCISCO.